(12) United States Patent
Lee et al.

(10) Patent No.: US 10,899,662 B2
(45) Date of Patent: Jan. 26, 2021

(54) DISPLAY WINDOW AND MANUFACTURING METHOD THEREOF

(71) Applicant: SAMSUNG DISPLAY CO., LTD., Yongin-si (KR)

(72) Inventors: Hoi Kwan Lee, Yongin-si (KR); Cheol Min Park, Yongin-si (KR); Eun Kyung Yeon, Yongin-si (KR); Jeong Seok Lee, Yongin-si (KR); Seung Ho Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 126 days.

(21) Appl. No.: 15/863,110

(22) Filed: Jan. 5, 2018

(65) Prior Publication Data

US 2018/0257982 A1 Sep. 13, 2018

(30) Foreign Application Priority Data

Mar. 10, 2017 (KR) .......................... 10-2017-0030501

(51) Int. Cl.
*C03C 23/00* (2006.01)
*C03C 15/02* (2006.01)
*C03C 21/00* (2006.01)

(52) U.S. Cl.
CPC ............ *C03C 23/008* (2013.01); *C03C 15/02* (2013.01); *C03C 21/002* (2013.01)

(58) Field of Classification Search
None
See application file for complete search history.

(56) References Cited

U.S. PATENT DOCUMENTS

| | | | | |
|---|---|---|---|---|
| 2003/0192348 A1* | 10/2003 | Kudoh | ................. | C03C 17/006 65/30.14 |
| 2010/0167059 A1* | 7/2010 | Hashimoto | ............ | C03C 21/00 428/410 |
| 2013/0273324 A1* | 10/2013 | Moll | ................... | C03C 23/0025 428/161 |
| 2014/0132856 A1* | 5/2014 | Hung | ..................... | C03C 25/10 349/12 |
| 2016/0122239 A1* | 5/2016 | Amin | ..................... | C03C 3/097 428/220 |
| 2016/0207828 A1* | 7/2016 | Kashima | ................ | C03C 3/091 |
| 2017/0184762 A1* | 6/2017 | Fujii | .................... | C03C 17/245 |
| 2017/0369354 A1* | 12/2017 | Endo | ...................... | C03B 29/08 |
| 2018/0052254 A1* | 2/2018 | Takai | .................. | G02B 5/0294 |

FOREIGN PATENT DOCUMENTS

JP 6010165 10/2016
WO WO 2015/008763 1/2015

* cited by examiner

*Primary Examiner* — Shamim Ahmed
(74) *Attorney, Agent, or Firm* — F. Chau & Associates, LLC (57) ABSTRACT

According to an exemplary embodiment of the present disclosure, a method of manufacturing a display window includes preparing a mother substrate, performing a salt treatment on the mother substrate to form a silicon-rich layer in a surface of the mother substrate to a first depth from the surface of the mother substrate, and removing the silicon-rich layer, wherein the first depth is greater than a depth of any cracks in the surface of the mother substrate, and a ratio of silicon content in the silicon-rich layer to a silicon content in the mother substrate is 1.2 to 1.4.

14 Claims, 9 Drawing Sheets

DISPLAY WINDOW AND MANUFACTURING METHOD THEREOF

CROSS-REFERENCE TO RELATED APPLICATION

This application claims priority under 35 U.S.C. § 119 from, and the benefit of, Korean Patent Application No. 10-2017-0030501 filed in the Korean Intellectual Property Office on Mar. 10, 2017, the contents of which are herein incorporated by reference in their entirety.

BACKGROUND

1. Technical Field

Embodiments of the present disclosure are directed to a display window and a manufacturing method thereof.

2. Discussion of the Related Art

Recently, various types of flat panel displays have been developed. Types of flat panel displays generally include a liquid crystal display (LCD), an organic light emitting diode (OLED), and an electrophoretic display (EPD), etc.

A flat panel display should present a clear, undistorted image to a user. Therefore, a window laminated on a flat panel display should be flat and have high transmittance. In addition, as the number of portable devices that use a flat panel display, such as smart phones or tablet PCs, increases, the display may be frequently exposed to external impacts. Therefore, a flat panel display should be able to withstand external impacts.

SUMMARY

An exemplary embodiment of the present disclosure provides a display window having high strength and transmittance.

According to an exemplary embodiment of the present disclosure, a method of manufacturing a display window includes preparing a mother substrate, performing a salt treatment on the mother substrate to form a silicon-rich layer in a surface of the mother substrate to a first depth from the surface of the mother substrate, and removing the silicon-rich layer, wherein the first depth is greater than a depth of any cracks in the surface of the mother substrate, and a ratio of a silicon content in the silicon-rich layer to a silicon content in the mother substrate is 1.2 to 1.4.

According to an exemplary embodiment of the present disclosure, elements of a first group and a second group may be removed from the mother substrate during the salt treatment.

According to an exemplary embodiment of the present disclosure, the salt treatment may be performed on the mother substrate with a neutral salt that includes potassium nitrate.

According to an exemplary embodiment of the present disclosure, the neutral salt may include potassium nitrate and sodium nitrate.

According to an exemplary embodiment of the present disclosure, the neutral salt may include about 70 wt % or more of potassium nitrate with respect to 100 wt % of the neutral salt.

According to an exemplary embodiment of the present disclosure, an acidity of the neutral salt may be from about pH 6 to about pH 8.

According to an exemplary embodiment of the present disclosure, the salt treatment may include dipping the mother substrate in a molten salt.

According to an exemplary embodiment of the present disclosure, the salt treatment may be performed on the mother substrate at a temperature of from about 400° C. to about 600° C.

According to an exemplary embodiment of the present disclosure, performing a salt treatment on the mother substrate may include performing a first salt treatment on the mother substrate at a first temperature and a second salt treatment on the mother substrate at a second temperature different from the first temperature.

According to an exemplary embodiment of the present disclosure, the salt treatment may further include performing a heat treatment between the first salt treatment and the second salt treatment.

According to an exemplary embodiment of the present disclosure, the first depth may be from about 100 nm to about 500 nm.

According to an exemplary embodiment of the present disclosure, the silicon-rich layer may include about 72 wt % or more of silicon (Si).

According to an exemplary embodiment of the present disclosure, removing the silicon-rich layer may include cleansing the silicon-rich layer using a basic solution.

According to an exemplary embodiment of the present disclosure, removing the silicon-rich layer may further include cleansing the silicon-rich layer using an acidic solution.

According to an exemplary embodiment of the present disclosure, a residual silicon-rich layer having a second depth may remain on a surface of the window after removing the silicon-rich layer, wherein the second depth is equal to a difference between the first depth and the depth of the cracks.

According to an exemplary embodiment of the present disclosure, a display window includes a silicon-rich layer disposed on a surface of the display window, wherein the silicon-rich layer has a second depth less than a first depth, wherein the first depth is a depth of an initial silicon-rich layer formed on a mother substrate from which said display window is formed, the first depth is greater than a depth of any cracks in the surface of the mother substrate, the second depth is equal to a difference between the first depth and the depth of the cracks, and a ratio of a silicon content in the silicon-rich layer to a silicon content in the mother substrate is 1.2 to 1.4.

According to an exemplary embodiment of the present disclosure, the display window may be sufficiently strong to withstand having a 135 g iron ball dropped from a height of up to 100 cm without breaking.

According to an exemplary embodiment of the present disclosure, a transmittance of the window may be 92% or more.

According to an exemplary embodiment of the present disclosure, a surface of the display window is sufficiently smooth so that a friction force of less than $15 \times 10^{-4}$ nNKT acts between a probe of an atomic force microscope and the display window when the surface of the display window is scratched by the probe.

According to an exemplary embodiment of the present disclosure, an apparatus for manufacturing a display window includes a cassette that fixes a mother substrate; and a batch reactor with an open end that holds a molten salt, wherein a size of the open end is greater than a planar size of the cassette. The cassette includes at least one fixing unit disposed on a substrate that fixes the substrate and the mother substrate to each other, and the batch reactor includes an injection hole for injecting salt and a heater that controls a temperature inside the batch reactor. One end of the mother substrate is inserted into the fixing unit, wherein a size of a portion of the mother substrate inserted into the fixing unit is considerably less than the size of the entire mother substrate, and the cassette and the mother substrate fixed on the cassette are dipped into molten salt inside the batch reactor for a salt treatment process.

An exemplary embodiment of the present disclosure can provide a display window having high strength and transmittance.

However, effects of embodiments of the present disclosure are not limited to the above-described effects, and may be variously extended without departing from the spirit and scope of embodiments of the present disclosure.

DETAILED DESCRIPTION OF THE EMBODIMENTS

Exemplary embodiments will now be described more fully hereinafter with reference to the accompanying drawings; however, they may be embodied in different forms and should not be construed as limited to the embodiments set forth herein.

Like reference numerals may designate like elements throughout the specification. In the accompanying drawings, dimensions of structures may be exaggerated for clarity.

In addition, it will be understood that when an element such as a layer, film, region, or substrate is referred to as being "on" another element, it can be directly on the other element or intervening elements may also be present.

Figure 1:
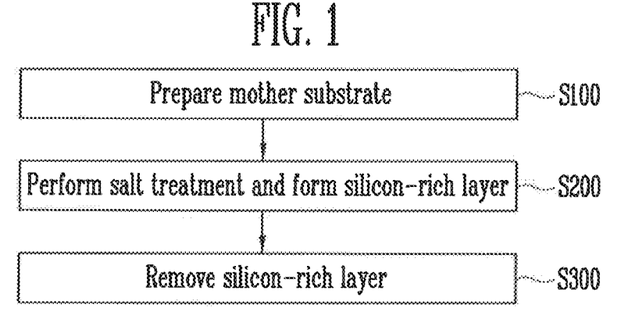
FIG. 1 is a flowchart of a method of manufacturing a display window according to an exemplary embodiment of the present disclosure.

FIG. 1 is a flowchart of a manufacturing method of a display window according to an exemplary embodiment of the present disclosure. In addition, FIGS. 2A to 2D are cross-sectional views of a display window in various steps of a manufacturing method of a display window according to an exemplary embodiment of the present disclosure.

Referring to FIG. 1, a manufacturing method of a display window according to an exemplary embodiment of the present disclosure includes preparing a mother substrate S100, performing a salt treatment to form a silicon-rich layer S200, and removing the silicon-rich layer S300.

In addition, according to an exemplary embodiment of the present disclosure, the salt treatment to form a silicon-rich layer S200 is performed on the mother substrate MS, and the silicon-rich layer SRL is formed from a surface of the mother substrate to a first depth on the mother substrate. In this case, the silicon-rich layer SRL is a layer having a higher silicon content than the mother substrate MS, and specifically a ratio of a silicon content of the silicon-rich layer SRL to a silicon content in the mother substrate MS is about 1.2 to about 1.4.

The mother substrate MS refers to a display window before a method of manufacturing a display window according to an exemplary embodiment of the present disclosure is performed, and a final display window WG is obtained from a method of manufacturing the display window according to an exemplary embodiment of the present disclosure. The mother substrate MS includes a silicon compound. For example, the mother substrate MS includes at least one of glass, aluminosilicate, borosilicate, boroaluminosilicate, etc. However, in addition to the examples listed above, silicon compounds having good durability, surface smoothness and transparency can be used as the mother substrate MS.

According to an exemplary embodiment, a shape of the mother substrate MS is not limited. Therefore, the mother substrate MS may have a shape such as a rectangle, a square, a circle, an ellipse, or a semi-ellipse, etc., when viewed in a plan view. The shape of the mother substrate MS can change depending on the shape of the display window WG in a display device. The size of the mother substrate MS can also change depending on the size of the display device or the display window WG.

Figure 2A:
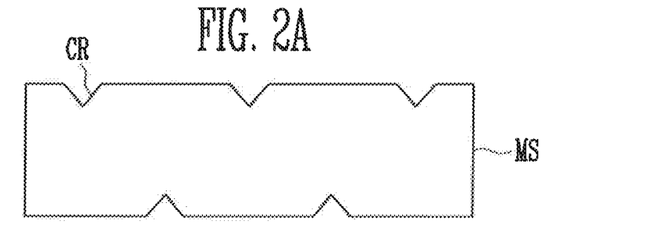
FIGS. 2A to 2D are cross-sectional views of a display window in various steps of a manufacturing method of a display window according to an exemplary embodiment of the present disclosure.

According to an exemplary embodiment, as shown in FIG. 2A, the mother substrate MS can have a crack CR in a surface thereof. In the cross-sectional view shown in FIG. 2A, the size of the crack CR is exaggerated for convenience of description, and in fact, since the crack CR at the surface of the mother substrate MS is microscopic, it is challenging to visually confirm. In the present disclosure, the term "crack CR" includes split gaps, flaws, etc., formed at the surface of the display window. The crack CR at the surface of the mother substrate MS may be formed during a glass production process such as cutting, chamfering, etching, transporting, storing, etc. The crack CR is microscopic as described above, and may be formed by friction, a collision, or a reaction with atmospheric moisture during the glass production process. In particular, a secondary process, such as chemical strengthening and printing, may be performed on the mother substrate MS of the display window WG, and the cracks CR may grow due to rapid temperatures changes during the secondary process. Therefore, the presence of cracks CR in the surface of the mother substrate MS can significantly degrade the strength and transmittance of the display window WG made from the mother substrate MS.

Figure 2B:
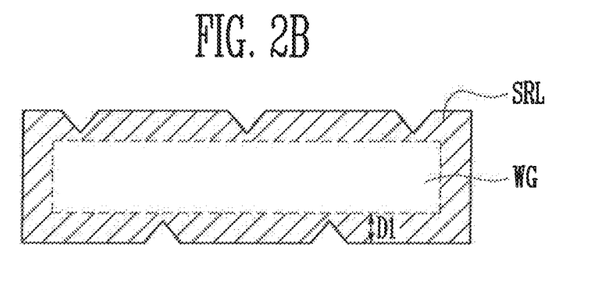

Referring to FIG. 2B, according to an exemplary embodiment, the mother substrate MS is salt-treated and the silicon-rich layer SRL is formed at the surface of the mother substrate MS. As described above, the silicon-rich layer SRL is a layer having a higher silicon content than the mother substrate MS. Specifically, a ratio of a silicon content of the silicon-rich layer SRL to a silicon content of the mother substrate MS is about 1.2 to about 1.4.

The silicon content is the weight of silicon (Si) as a percentage of the total weight of the silicon-rich layer SRL or the mother substrate MS. The silicon content in the silicon-rich layer SRL may be about 72 wt % or more.

According to an exemplary embodiment, to form the silicon-rich layer SRL, a salt treatment is performed on the mother substrate. The salt treatment involves coating a high temperature salt on the surface of the mother substrate MS. When the high temperature salt is coated on the surface of the mother substrate MS, a reaction occurs between the mother substrate MS and the salt, and elements other than silicon that are disposed between the surface of the mother substrate MS and a first depth D1 from the surface are removed from the mother substrate MS. The elements removed from the mother substrate include elements of group 1 or 2. For example, alkali metals and alkali earth metals, such as potassium, calcium, magnesium, and sodium, disposed between the surface of the mother substrate MS and the first depth D1 from the surface, are removed during the salt treatment. Therefore, after the salt treatment, a relatively large concentration of silicon (Si) is included in a region between the surface of the mother substrate MS and the first depth D1 from the surface, as compared to other regions of the mother substrate MS.

According to an exemplary embodiment, the salt used in the salt treatment is a neutral salt that includes potassium nitrate ($KNO_3$). A neutral salt has neutral acidity. Neutral acidity includes not only acidity of about 7 pH, but also such acidity that does not adversely affect the display window WG and a manufacturing apparatus of the display window. For example, a neutral salt may include weak acids of pH 6 to 7, or weak bases of pH 7 to 8. When the salt treatment is performed using an acid salt or a basic salt, the display window WG and a manufacturing apparatus of the display window can be adversely affected. In particular, the manufacturing apparatus of the display window can be corroded by the acid salt or the basic salt. Therefore, when a salt treatment is performed using an acid salt or a basic salt, the lifetime of the manufacturing apparatus can be shortened, and a process cost can increase due to replacement of the manufacturing apparatus. According to an exemplary embodiment of the present disclosure, since a neutral salt that includes potassium nitrate ($KNO_3$) is used in the salt treatment, the lifetime of the manufacturing apparatus of the display window can be increased.

According to an exemplary embodiment, the salt treatment is perform by dipping the mother substrate MS in a molten salt. By dipping the mother substrate MS in molten salt, the mother substrate MS uniformly reacts with the salt at the surface thereof. Since the mother substrate MS reacts uniformly at the surface thereof, the silicon-rich layer SRL is uniformly formed.

According to an exemplary embodiment, the salt treatment is performed on the mother substrate at a process temperature in the range of about 400° C. to about 600° C. The process temperature is higher than the melting point of the salt. Therefore, during the salt treatment, the salt remains in a molten state. In addition, by maintaining the process temperature within the above range, the reaction between the mother substrate MS and the salt is accelerated at the surface of the mother substrate MS. When the process temperature is less than about 400° C., a reaction rate between the mother substrate MS and the salt decreases, and the formation of the silicon-rich layer SRL deteriorates. When the process temperature is greater than about 600° C., the reaction rate between the salt and the mother substrate MS increases and can corrode the surface of the mother substrate. As the surface of the mother substrate corrodes, haze increases at the surface of the mother substrate MS, which can degrade the transparency of the display window WG made from the mother substrate MS. In addition, besides removing elements of group 1 or 2, other side reactions can occur at the surface of the mother substrate MS, which can also degrade the quality of the display window WG.

A plurality of salt treatments can be performed. According to an exemplary embodiment of the present disclosure, a first salt treatment is performed on the mother substrate MS at a first temperature and a second salt treatment is performed thereon at a second temperature different from the first temperature. The first salt treatment and the second salt treatment differ from each other in the composition ratio of the salt and a process time as well as the process temperature. Therefore, when a plurality of salt treatments are performed on the mother substrate MS, two or more reactors may be required for the salt treatment. In this case, the process temperatures of each of the reactors and the salt composition input to each of the reactors may differ. The number of salt treatments performed varies depending on the composition of the mother substrate MS and the number and sizes of the cracks CR. For example, if the mother substrate MS includes a relatively large number of elements of group 1 or 2, and there are many deep cracks CR present on the surface of mother substrate MS, a plurality of salt treatment are performed. In addition, when a plurality of salt treatments are performed on the mother substrate MS, a heat treatment may be further performed between the various salt treatments, if necessary.

According to an exemplary embodiment of the present disclosure, the silicon-rich layer SRL is formed from the surface of the mother substrate MS to the first depth D1. The first depth D1 is a vertical distance from the surface of the mother substrate MS without a crack CR. When a salt treatment is performed on the mother substrate MS by dipping the mother substrate MS in a batch reactor, the silicon-rich layer SRL having the same depth at entire surface of the mother substrate MS is formed. However, depending on the salt treatment method, the silicon-rich layer SRL may not be formed with a uniform depth from the surface of the mother substrate MS. In this case, the depth of the silicon-rich layer SRL varies as a function of position thereof. In addition, the depth of the silicon-rich layer SRL under the surface where the crack CR is formed is less than the depth under the surface where no crack CR is formed, as shown in the cross-sectional view of FIG. 2B. As described above, when the depth of the silicon-rich layer SRL differs as a function of position thereof, the first depth D1 is an average value of the depth of the silicon-rich layer SRL.

According to an exemplary embodiment of the present disclosure, the first depth D1 is about 100 nm to about 500 nm. If the first depth D1 is less than about 100 nm, then the thickness of the silicon-rich layer SRL is insufficient to prevent cracks CR from being formed through the silicon-rich layer SRL into the display window WG. In addition, when the first depth D1 is greater than about 500 nm, the silicon-rich layer SRL is too thick to be sufficiently removed in a removal process, and thus an excessive amount of the silicon-rich layer SRL is too thick to be sufficiently removed in a removal process may remain at the surface of the display window WG. This residual silicon-rich layer SRL can reduce the surface compressive stress formed by the chemical strengthening. When an excessive residual silicon-rich layer SRL remains at the surface of the display window WG, the optical property of the display window WG are degraded.

Figure 2C:
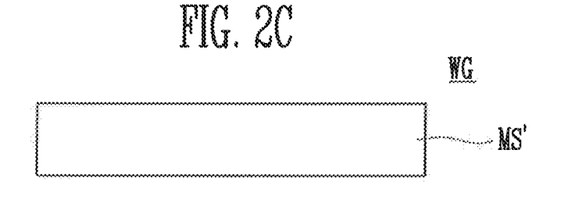

According to an exemplary embodiment of the present disclosure, the first depth D1 is greater than the depths of the cracks CR at the surface of the mother substrate MS. Therefore, the cracks CR at the surface of the mother substrate MS does not extend through the silicon-rich layer SRL into the display window WG. As shown in FIG. 2C, the silicon-rich layer SRL is removed, and thus the cracks CR in the surface of the mother substrate MS are also removed. As described above, since the first depth D1 is greater than the depths of the cracks CR in the surface of the mother substrate MS, the surface of the display window WG formed after the removal of the silicon-rich layer SRL is flat, without any cracks CR.

Figure 2D:
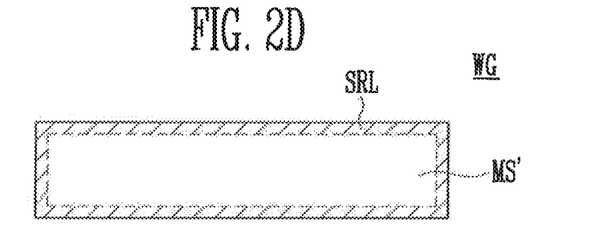

Referring to FIG. 2C, according to an exemplary embodiment of the present disclosure, the removal process removes the silicon-rich layer SRL, leaving behind an inner region MS'. In this case, as the silicon-rich layer SRL is removed as described above, cracks CR in the surface of the mother substrate MS are also removed. However, the silicon-rich layer SRL is not completely removed in the removal process. According to an exemplary embodiment of the present disclosure, when the first depth D1 of the silicon-rich layer SRL is greater than the depth of the crack CR, a portion of the silicon-rich layer SRL remains on the inner region MS' after the removal of the silicon-rich layer SRL, as illustrated in FIG. 2D. The silicon-rich layer that remains on the inner region MS' has a second depth that is substantially equal to a difference between the first depth and the depth of the cracks. Further, as shown in FIG. 2D, the cracks CR in the mother substrate MS have been completely removed.

According to an exemplary embodiment of the present disclosure, since the silicon-rich layer SRL is removed by cleansing with a basic solution, hereinafter referred to as a basic cleansing process, cleansing with an acidic solution, hereinafter referred to as an acidic cleansing process, is not performed. Since an acidic cleansing process can be omitted, the process of removing the silicon-rich layer SRL is simplified. In addition, the equipment for the removal process can be simplified. In addition, if no acidic cleansing process is performed, there is less risk of corroding the equipment. Therefore, the equipment lifetime can be increased. However, if necessary, an acidic cleansing process may be further performed before or after the basic cleansing process.

According to an exemplary embodiment of the present disclosure, there is no limitation on the basic cleansing solution, but hydroxides of alkali metals, such as sodium hydroxide, potassium hydroxide and lithium hydroxide, hydroxides of alkali earth metals, such as calcium hydroxide, inorganic alkali metal salts such as sodium carbonate, organic alkali metal salts such as sodium acetate, ammonia water, etc., can be used as the basic solution. When sodium hydroxide is used as the basic solution, the content of sodium hydroxide in the basic solution is about 4 wt %.

According to an exemplary embodiment of the present disclosure, a basic cleansing process is performed at room temperature. If a basic cleansing process using the basic solution is performed at a high temperature together with the salt treatment process, the display window WG may be damaged by the basic solution.

According to an exemplary embodiment of the present disclosure, an acidic cleansing process can be further performed to remove the silicon-rich layer SRL. There is no limitation on the acidic solution, and inorganic acids, such as hydrochloric acid, sulfuric acid, nitric acid, and hydrogen fluoride, and organic acids, such as formic acid, oxalic acid, citric acid, acetic acid and benzoic acid, can be used as the acidic solution. When nitric acid (HNO3) is used as the acidic solution, the content of nitric acid in the acidic solution is about 6 wt % or less.

In addition, according to an exemplary embodiment of the present disclosure, after an acidic cleansing process, any alkali metals or alkali earth metals present in the silicon-rich layer SRL can be further removed to form a new silicon-rich layer SRL at the surface of the mother substrate MS. Such a silicon-rich layer SRL has a middle refractive index between a refractive index of glass and a refractive index of air, so that the reflectance of the display window WG can be decreased and the transmittance of the display window WG can be increased. In addition, as the silicon-rich layer SRL including cracks CR is removed, there is no degradation of the display window WG due to cracks CR.

According to an exemplary embodiment of the present disclosure, an acidic cleansing process is performed at room temperature. If the acidic cleansing process is performed at a high temperature together with the salt treatment process, the display window WG can be damaged by the acidic solution.

According to an exemplary embodiment of the present disclosure, the silicon-rich layer SRL is removed by dipping and stirring the salt-treated mother substrate MS in a basic or acidic solution at room temperature. In this case, the time required for the stirring process is shorter than the time required for the salt treatment process.

Figure 3:
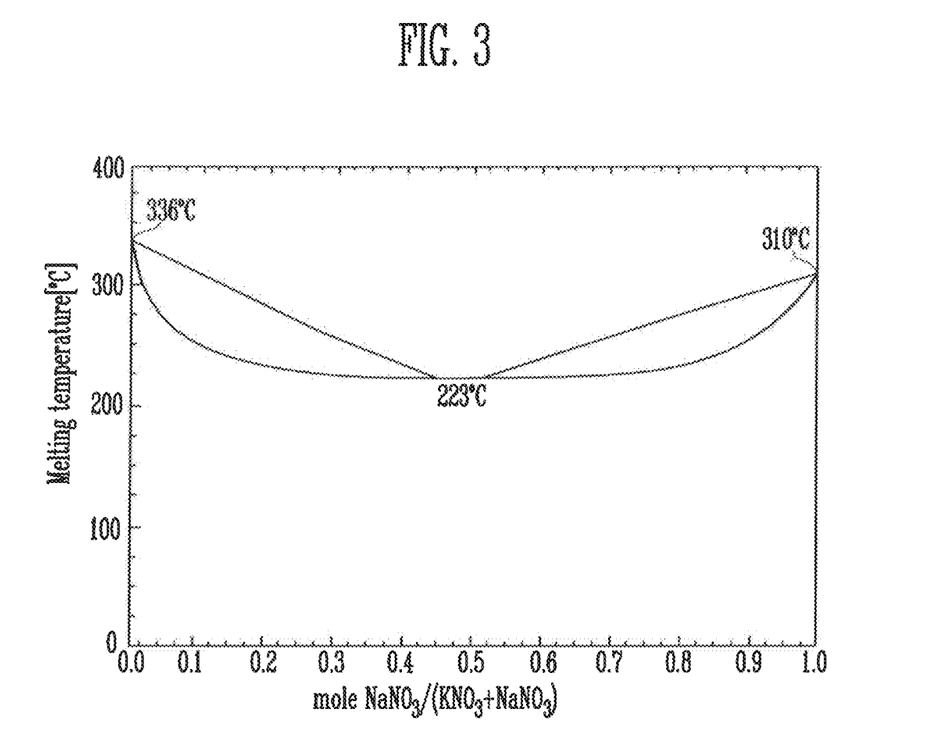
FIG. 3 is a graph that illustrates a melting temperature as a function of the composition of a salt composed of potassium nitrate and sodium nitrate.

FIG. 3 is a graph that illustrates melting temperature as a function of the composition of a salt composed of potassium nitrate and sodium nitrate. As described above, the salt is in a molten state during the salt treatment process. Therefore, the salt should be melted before dipping the mother substrate into the salt.

According to an exemplary embodiment of the present disclosure, the neutral salt is composed of potassium nitrate ($KNO_3$) and sodium nitrate ($NaNO_3$). In this case, since the salt is composed of potassium nitrate and sodium nitrate, the melting temperature of the salt may be controlled. Thus, by using a mixture of potassium nitrate and sodium nitrate as a salt, the melting temperature of the salt can be lowered.

Specifically, according to an exemplary embodiment of the present disclosure, referring to FIG. 3, when the salt is composed of only potassium nitrate, the salt has the melting temperature of about 336° C. However, when potassium nitrate and sodium nitrate are mixed at a mole ratio of 5:5, the melting temperature of the salt is about 223° C. According to the composition of the salt, the melting temperature of the salt differs by at about 100° C.

According to an exemplary embodiment of the present disclosure, the lower the melting temperature of the salt is, the more favorable the salt treatment is. As described above, since the salt remains in a molten state during the salt treatment process, a lower salt melting temperature enables the salt treatment to be performed at a relatively low process temperature. Keeping the process temperature relatively low reduces process costs otherwise used to raise the process temperature. In addition, side reactions that can occur at higher process temperatures can be suppressed. In addition, by maintaining a uniform process temperature, a relatively thick silicon-rich layer is formed when the melting temperature of the salt is low. By forming a thick silicon-rich layer, any deep cracks at the surface of the mother substrate are also included within the silicon-rich layer. However, the salt melting temperature is not the only consideration in determining the salt composition; the salt composition is also determined based on the glass composition, the silicon-rich layer thickness, etc.

According to an exemplary embodiment of the present disclosure, when the neutral salt is composed of potassium nitrate and sodium nitrate, the neutral salt includes about 70 wt % or more of potassium nitrate. In particular, as shown in FIG. 3, when the neutral salt is about 70 wt % or more of potassium nitrate, the melting temperature of the neutral salt is lowered.

Figure 4A:
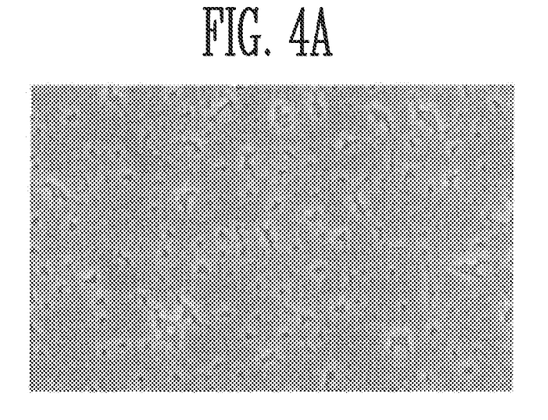
FIG. 4A is an enlarged plan view of a surface of a silicon-rich layer according to an exemplary embodiment of the present disclosure.
Figure 4B:
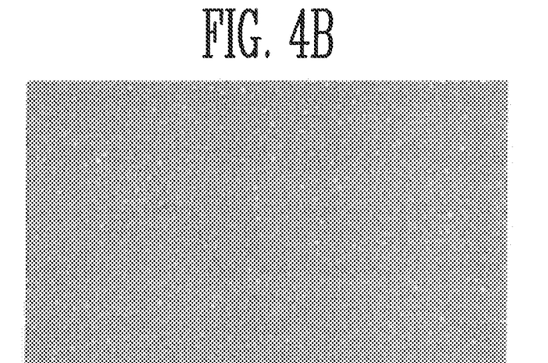
FIG. 4B is an enlarged plan view of a surface of a display window according to an exemplary embodiment of the present disclosure.

FIG. 4A is an enlarged plan view of a surface of a silicon-rich layer according to an exemplary embodiment of the present disclosure. In addition, FIG. 4B is an enlarged plan view of a surface of a display window according to an exemplary embodiment of the present disclosure. FIGS. 4A and 4B are images obtained by scanning a surface of a silicon-rich layer and a display window using a scanning electron microscope (SEM), respectively.

First, according to an exemplary embodiment of the present disclosure, referring to FIG. 4A, a plurality of cracks are present in the surface of the silicon-rich layer. As shown in FIG. 4A, the cracks have various sizes and shapes. The silicon-rich layer of FIG. 4A is formed by performing a first salt treatment process and a second salt treatment process on a mother substrate. The first salt treatment process was performed using a neutral salt composed of about 70 wt % of potassium nitrate (KNO3) and about 30 wt % of sodium nitrate ($NaNO_3$) at about 530° C. In addition, the second salt treatment process was performed using a neutral salt composed of 100 wt % of potassium nitrate ($KNO_3$) at about 420° C.

Next, according to an exemplary embodiment of the present disclosure, referring to FIG. 4B, the silicon-rich layer has been removed and the cracks in the surface of the mother substrate have also been removed. The surface of the display window of FIG. 4B is flat without cracks. The display window was formed by cleansing the silicon-rich layer using an acidic solution and then cleansing using a basic solution. According to an embodiment, an aqueous solution of about 6 wt % of nitric acid ($HNO_3$) was used as the acidic solution, and an aqueous solution of about 4 wt % of sodium hydroxide (NaOH) was used as the basic solution. Cleansing with the acidic solution and cleansing with the basic solution were performed with stirring at 20° C.

Figure 5:
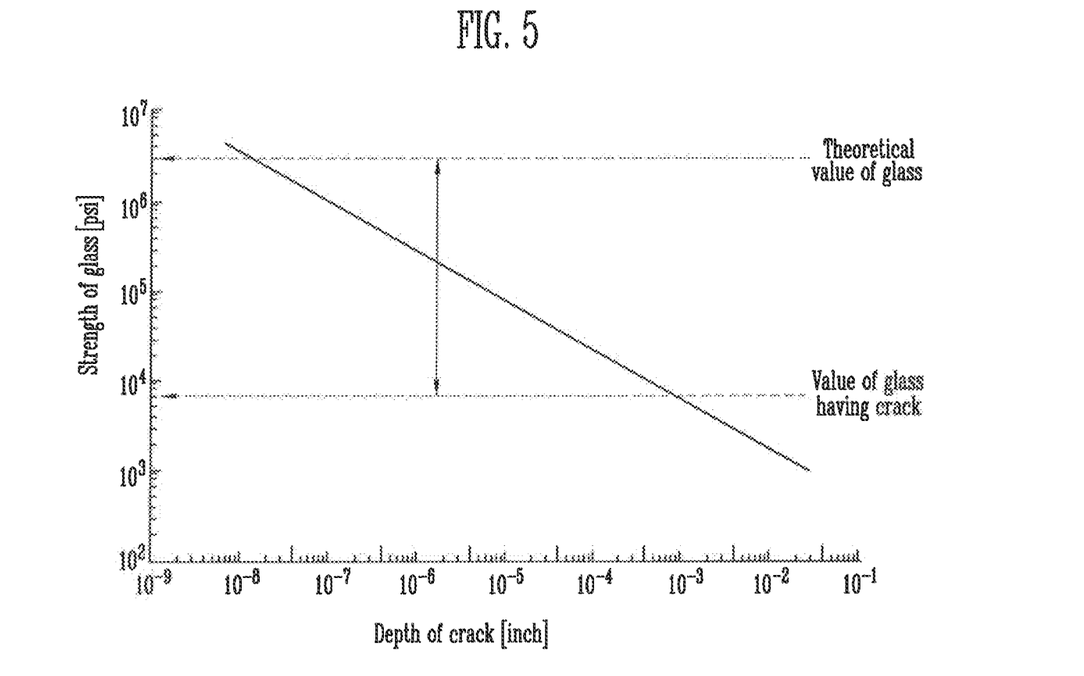
FIG. 5 is a graph that illustrates the strength of a glass display window as a function of the size of a micro crack.

FIG. 5 is a graph that illustrates the strength of a display window as a function of the size of a micro crack. According to FIG. 5, the size of the crack and the strength of the glass are inversely proportional. The strength of the glass without any cracks, i.e., the theoretical strength of the glass, is about $3 \times 10^6$ psi. On the other hand, the strength of the glass having cracks of about $10^{-3}$ inch size is about $6.5 \times 10^3$ psi. When the above two cases are compared, the strength of the glass differs by about 400 times or more, based on the size of the crack. Therefore, cracks in the glass should be removed to improve the strength of the glass.

Figure 6A:
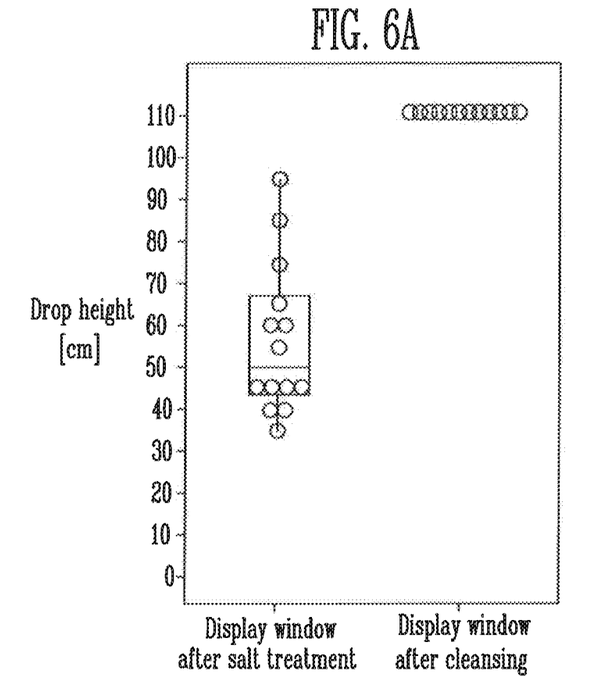
FIGS. 6A to 6C are graphs that illustrate the strength of a display window before and after cleansing, according to an exemplary embodiment of the present disclosure.
Figure 6B:
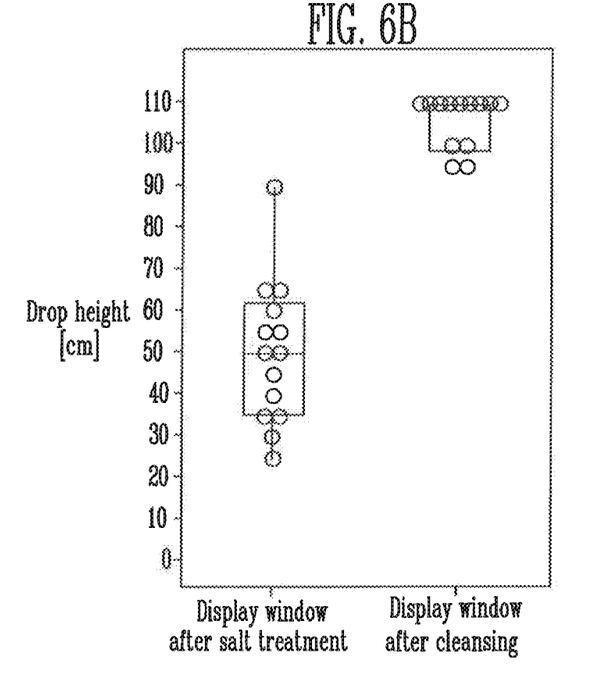
Figure 6C:
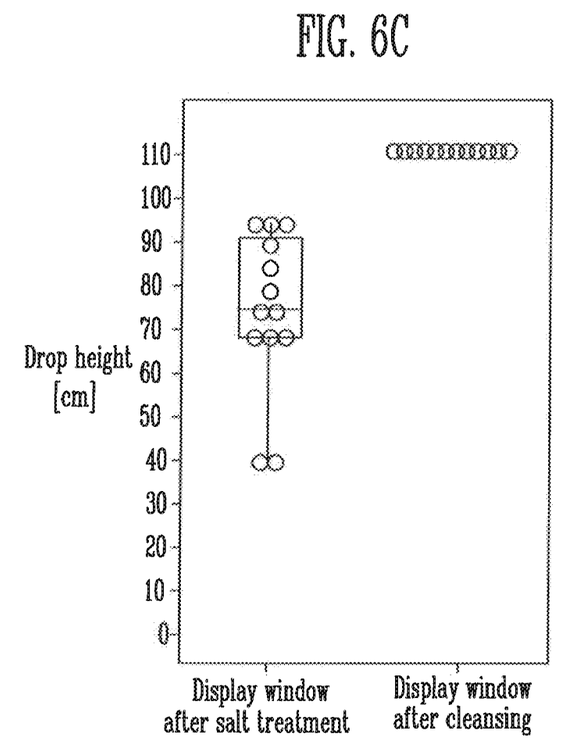

FIGS. 6A to 6C are graphs that illustrating the strength of a display window before and after cleansing, according to an exemplary embodiment of the present disclosure. A display widow according to an exemplary embodiment of the present disclosure is manufactured by a method that includes preparing a mother substrate, performing a salt treatment on the mother substrate to form a silicon-rich layer from a surface of the mother substrate to a first depth of the mother substrate, and removing the silicon-rich layer. In addition, the first depth is greater than a depth of a crack in the surface of the mother substrate, and a ratio of a silicon content in the silicon-rich layer to a silicon content in the mother substrate is 1.2 to 1.4.

According to an exemplary embodiment of the present disclosure, FIG. 6A illustrates the strength of a display window after performing a first salt treatment at about 530° C. and a secondary salt treatment at about 420° C. The left side in FIG. 6A illustrates an evaluation of the strength of a display window in which a silicon-rich layer remains without a cleansing process, and the right side in FIG. 6A illustrates an evaluation of the strength of a display window in which a silicon-rich layer is removed with a cleansing process.

According to an exemplary embodiment of the present disclosure, FIG. 6B illustrates the strength of a display window after sequentially performing a first salt treatment at about 530° C., a heat treatment at about 530° C., and a second salt treatment at about 420° C., The left side in FIG. 6B illustrates an evaluation of the strength of a display window in which a silicon-rich layer remains without a cleansing process, and the right side in FIG. 6B illustrates an evaluation of the strength of a display window in which a silicon-rich layer is removed with a cleansing process.

According to an exemplary embodiment of the present disclosure, FIG. 6C illustrates the strength of a display window after sequentially performing a first salt treatment at about 530° C., a heat treatment at about 530° C., and a second salt treatment at about 420° C. The duration of the heat treatment performed on the display window shown in FIG. 6C was two times longer than the duration of the heat treatment performed on the display window shown in FIG. 6B. The left side in FIG. 6C illustrates an evaluation of the strength of a display window in which a silicon-rich layer remains without a cleansing process, and the right side in FIG. 6C illustrates an evaluation of the strength of a display window in which a silicon-rich layer is removed with a cleansing process.

In all the exemplary embodiments shown in FIGS. 6A to 6C, a neutral salt composed of about 70 wt % of potassium nitrate ($KNO_3$) and about 30 wt % of sodium nitrate ($NaNO_3$) was used in the first salt treatment process, and a neutral salt composed of 100 wt % of potassium nitrate ($KNO_3$) was used in the second salt treatment process.

According to an exemplary embodiment of the present disclosure, the evaluation of the strength of the display window was performed by measuring the drop height of an iron ball (Fe) of about 135 g in which the display window was broken when the iron ball (F) was dropped on the display window. Therefore, according to an exemplary embodiment of the present disclosure, the higher the drop height of the iron ball in which the display window is broken, the greater the impact that the display window can withstand and higher the strength of the display window.

Referring to FIG. 6A, according to an exemplary embodiment of the present disclosure, iron balls (Fe) were dropped on 14 different display windows, and the heights, hereinafter referred to as breakage heights, at which the display windows were broken were measured. The range of breakage heights of the display window before cleansing was relatively wide, from about 35 cm to about 95 cm. In this case, referring to the effective data, i.e., data corresponding to the box marked portion in the drawing, the breakage height of the display window before cleansing is about 45 cm to about 67 cm. The range of breakage height data before cleansing is wide because cracks are present in the silicon-rich layer in the display window before cleansing. Since the cracks present in the display window have various shapes and sizes, the breakage height also has a wide range of values. On the other hand, the breakage height of the display window after cleansing is uniformly about 110 cm. This is because cracks present in the display window are removed with the silicon-rich layer by the cleansing. In addition, the increase in the breakage height of the display window after cleansing means that the cracks have been removed, regardless of their sizes or shapes. Therefore, according to a present disclosure, cracks can be removed regardless of their shapes and sizes.

Referring to FIG. 6B, according to an exemplary embodiment, iron balls (Fe) were dropped on 14 different display windows, and the breakage heights at which the display window were broken were measured. The range of breakage heights of the display window before cleansing was relatively wide, from about 20 cm to about 90 cm. In this case, referring to the effective data, i.e., data corresponding to the box marked portion in the drawing, the breakage height of the display window before cleansing is about 35 cm to about 60 cm. The breakage height of the display window after cleansing is about 100 cm to about 110 cm. Referring to FIG. 6B, cracks are removed with the silicon-rich layer by the cleansing, which increases the strength of the display windows.

Referring to FIG. 6C, according to an exemplary embodiment, iron balls (Fe) were dropped on 14 different display windows, and the breakage heights at which the display windows were broken were measured. Referring to the effective data of the breakage height, i.e., data corresponding to the box marked portion in the drawing, of the display windows before cleansing, the breakage heights range is about 70 cm to about 90 cm. The breakage heights of the display windows after cleansing are about 110 cm. The strength of the display windows before cleansing according to an exemplary embodiment shown in FIG. 5C is greater than the strength of the display windows before cleansing according to exemplary embodiments shown in FIG. 6A or 6B. This is because a display window according to an exemplary embodiment of FIG. 5C is heat-treated together with the salt treatment. Display windows according to an exemplary embodiment of FIG. 6B are also heat-treated, but the heat treatment is insufficient, and display windows according to an exemplary embodiment of FIG. 6B have less strength than display windows according to an exemplary embodiment of FIG. 6C. Referring to FIG. 6C, the cracks are removed with the silicon-rich layer by cleansing, which increases the strength of the display windows.

According to an exemplary embodiment, as described above with reference to FIG. 5, since the size of the cracks affects the strength of the glass, the strength of the glass can be increased by removing the cracks. According to a method of manufacturing a display window according to an exemplary embodiment of the present disclosure, the strength of a display window can be increased by removing cracks in the surface of the display windows, as shown in FIGS. 6A to 6C. Specifically, a display window according to an exemplary embodiment of the present disclosure has a breakage height of about 100 cm or more when a 135 g iron ball (Fe) is dropped on a display window. A display window according to a present disclosure can withstand the impact that may be applied during transportation or use by having such a breakage height or strength as described above. Therefore, a display window according to an embodiment of the present disclosure has excellent impact resistance.

Since a display window according to an embodiment of the present disclosure has excellent impact resistance, the display window can be used for a window of a display device that requires flexibility. A flexible display window can be bent or folded as needed. According to an embodiment, a display window can be easily bent or folded by having a relatively small bending stiffness. The bending stiffness of a display window can be expressed by Equation 1.

$$BS \propto E \times TH^3 \qquad \text{[Equation 1]}$$

In EQ. 1, BS is a bending stiffness of the display window, E is an elastic modulus of the display window, and TH is a thickness of the display window. The bending stiffness of the display window is proportional to a cube of the thickness of the display window. Therefore, for a display window to have a relatively small bending stiffness, the display window must be relatively thin.

As described above, in an exemplary embodiment of the present disclosure, a display window has a thickness in a range of about 10 μm to about 150 μm. By having this thickness range, a display window according to an embodiment of the present disclosure can have a relatively small bending stiffness and can be easily bent or folded.

According to an exemplary embodiment, when a display window is deformed by being bent or folded, a repulsive force against the deformation occurs in the display window. The repulsive force against the deformation of the display window can be expressed by Equation 2.

$$F = \frac{wt}{6Y}\left(1.19814Y\frac{t}{D-t}\right) \qquad \text{[Equation 2]}$$

In EQ. 2, Y is Young's modulus, t is a thickness of the display window, w is a width of the display window, and D is a distance between both ends of the display window that face each other when folded. D substantially corresponds to twice the curvature radius of the display window. A display window can be set to have a curvature radius of about 1 mm to about 10 mm, and the curvature radius satisfies the corresponding D in EQ. 2. According to EQ. 2, when other conditions are the same, the repulsive force when the thickness of the display window is about 100 μm and D is about 10 mm is about three times the repulsive force when the thickness of the display window is about 70 μm.

Therefore, according to an exemplary embodiment, a large repulsive force can be applied to the display window when the display window is bent. In addition, when the thickness of the display window is reduced to reduce the repulsive force and the bending stiffness of the display window, the display window may be vulnerable to an external impact.

Since a display window according to embodiments of the present disclosure has no cracks and excellent impact resistance, a display window can withstand external impacts, even if it is relatively thin to be flexible. Therefore, a display window according to an embodiment of the present disclosure can be used as a window of a display device that requires flexibility.

Figure 7:
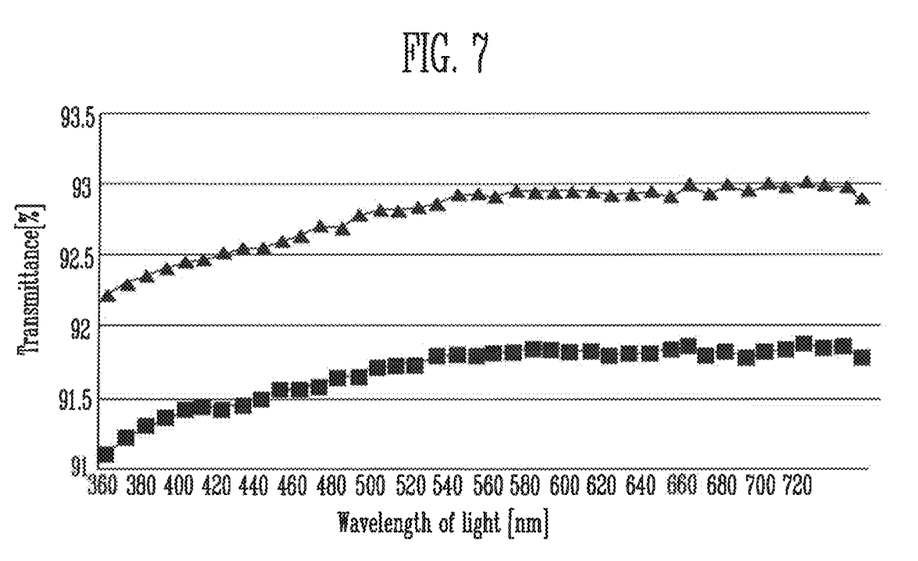
FIG. 7 is a graph that illustrates transmittance as a function of wavelength for a display window according to an exemplary embodiment of the present disclosure and for a display window according to the prior art.
Figure 8A:
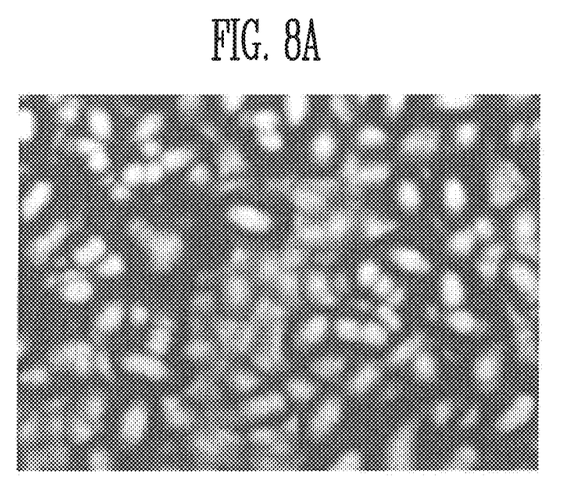
FIG. 8A is an enlarged plan view of a display window according to the prior art.
Figure 8B:
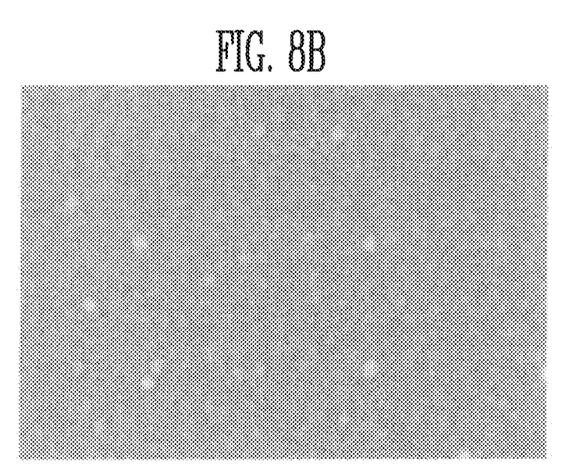
FIG. 8B is an enlarged plan view of a display window according to an exemplary embodiment of the present disclosure.

FIG. 7 is a graph that illustrates transmittance as a function of wavelength for a display window according to an exemplary embodiment of the present disclosure and for a display window according to the prior art. FIG. 8A is an enlarged plan view of a display window according to the prior art, and FIG. 8B is an enlarged plan view of a display window according to an exemplary embodiment of the present disclosure. FIGS. 8A and 8B are images obtained by scanning a surface of a display window using a scanning electron microscope (SEM), respectively.

Referring to FIG. 7, according to an exemplary embodiment of the present disclosure, the transmittance of a display window according to an exemplary embodiment of the present disclosure is greater than the transmittance of a display window according to the prior art in all wavelength bands. A display window according to the prior art has a relatively low transmittance because recesses can be formed in the surface of the display window during removal of the cracks.

According to the prior art, cracks in the mother substrate can be removed by polishing after a physical polishing or acid treatment. For example, according to the prior art, a crack can be removed by treating the mother substrate with hydrofluoric acid (HF) and polishing or cleansing the periphery of the crack so as to form a gradual recess around the crack. Since the decrease of strength due to the crack is influenced by the size and the shape of the crack, as expressed by Equation 3, below, the gradual recess formed in the prior art can reduce the decrease of strength of a display window due to the crack.

$$\sigma = \frac{K_{IC}}{Y\sqrt{\pi a}} \qquad \text{[Equation 3]}$$

In EQ. 3, σ is the strength of the display window, Y is the shape factor of the crack, a is the size of the crack, $K_{IC}$ is fracture toughness.

This is because a gradual recess has a smaller shape factor (Y) and size (a) than a narrow, deep crack.

However, when a crack in the mother substrate is removed according to the prior art, optical properties of the display window can be significantly degraded. Specifically, a recess formed in a position where the crack was present may be viewed by the user. In addition, luminance of the display window surface can be increased by the recess of the surface of the display window. Such degradation of the optical properties can degrade the quality of the image output from a display device.

Referring to FIG. 8A, a plurality of rice grain patterns are visible at the surface of the display window after a crack has been removed. The rice grain patterns correspond to recesses formed in the surface of the display window after the crack was removed. According to the prior art, as the crack is removed, the strength of the display window increases, but the transmittance decreases.

Referring to FIG. 8B, no recesses visible as rice grain patterns are formed in the surface of a display window according to an embodiment of the present disclosure. The surface of a display window according to an embodiment of the present disclosure substantially flat, and thus the transmittance of the display window is also high. Therefore, according to an embodiment of the present disclosure, the strength and transmittance of a display window can be increased by removing cracks. According to embodiments of the present disclosure, since the surface is flattened by removing cracks present on the surface, the transmittance of the display window is higher than the transmittance of the mother substrate.

Referring to FIG. 7, the transmittance of a display window according to an exemplary embodiment of the present disclosure is about 92% or more for all wavelength bands after cleansing. Since a display window according to embodiments of the present disclosure is disposed on the front surface of a display device, the image output from the display device is transmitted to the user without distortion. A display window according to embodiments of the present disclosure has a transmittance of about 92% or more, so that an image can be transmitted to a user without distortion, regardless of the wavelength of light output from the display device.

In addition, referring to Table 1, according to an exemplary embodiment of the present disclosure, when the surface of a display window is scratched with a probe of an atomic force microscope, a friction force of $15 \times 10^{-4}$ nNKT or less acts between the probe and the display window.

TABLE 1

| Load applied by | Frictional force | |
|---|---|---|
| probe | Prior art | Present disclosure |
| 50 nN | 23 × 10 | $15 \times 10^{-4}$ $nNK_T$ |
| 60 nN | $25 \times 10^{-4}$ $nNK_T$ | $16 \times 10^{-4}$ $nNK_T$ |
| 70 nN | $28 \times 10^{-4}$ $nNK_T$ | $20 \times 10^{-4}$ $nNK_T$ |

The data in Table 1 is obtained by measuring the frictional force applied to the probe when the surface of a display window from which a crack has been removed according to the prior art and the surface of the display window from which a crack has been removed according to an exemplary embodiment of the present disclosure are scratched with the probe of the atomic force microscope. According to embodiments, the probe of an atomic force microscope scratches the surface of a display window in a lateral direction while pressing the surface of the display window, and the load applied by the probe presses the probe of the atomic force microscope into the surface of the display window.

Referring to Table 1, a larger frictional force acts at the surface of the display window in which the crack has been removed according to the prior art. This is because a plurality of recesses are disposed in the surface of a display window from which a crack has been removed, according to the prior art. Since a display window according to an embodiment of the present disclosure has a flat surface, frictional forces acting between the probe of the atomic force microscope and the surface of the display window are relatively small.

Figure 9:
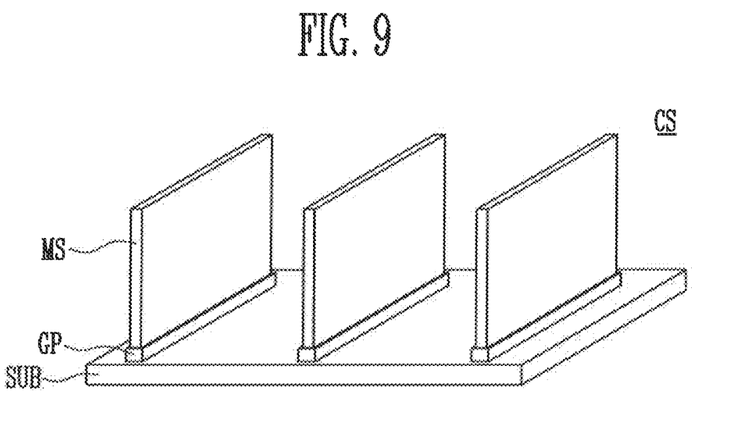
FIGS. 9 and 10 are perspective views that illustrate a manufacturing apparatus of a display window according to an exemplary embodiment of the present disclosure.
Figure 10:
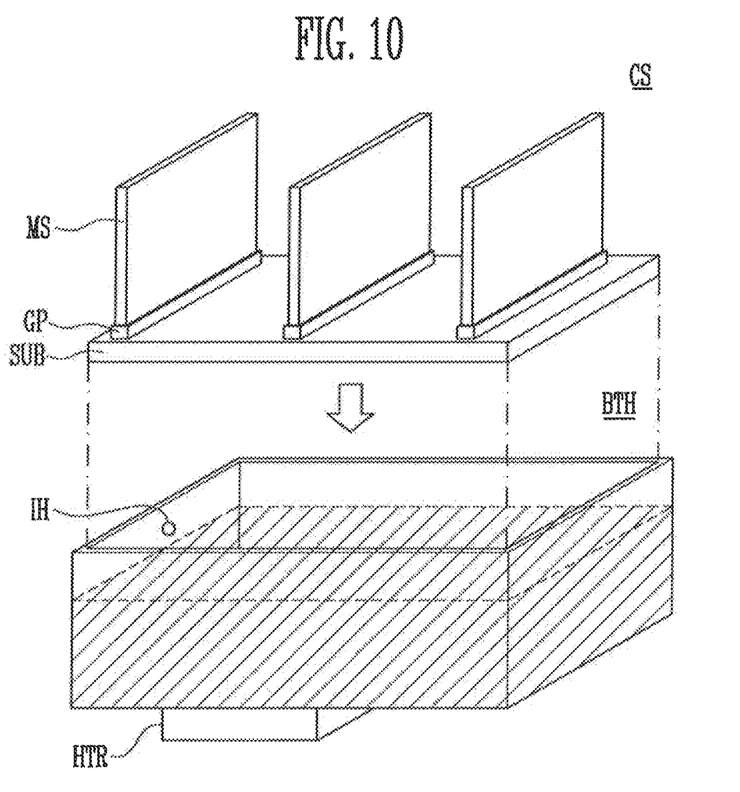

FIGS. 9 and 10 are perspective views that illustrating a manufacturing apparatus of a display window according to an exemplary embodiment of the present disclosure. According to an exemplary embodiment of the present disclosure, a manufacturing apparatus of a display window performs method of manufacturing a display window, including preparing the mother substrate MS, performing a salt treatment on the mother substrate MS to form a silicon-rich layer from a surface of the mother substrate MS to a first depth of the mother substrate MS, and removing the silicon-rich layer. In addition, a manufacturing apparatus of a display window includes a cassette CS that fixes a mother substrate MS and a batch reactor BTH into which the cassette CS and the mother substrate MS fixed on the cassette CS are dipped in a molten salt.

Referring to FIG. 9, according to an exemplary embodiment of the present disclosure, the cassette CS includes a fixing unit GP disposed on a substrate SUB that fixes the substrate SUB and the mother substrate MS to each other. A plurality of fixing units GP are disposed on the substrate SUB. Three fixing units GP are shown in FIG. 9, but this is for convenience of description, and embodiments are not limited to the number of fixing units GP shown in FIG. 9. In other embodiments, to improve the efficiency of the process, those skilled in the art may provide more fixing units GP on the substrate SUB.

According to an exemplary embodiment of the present disclosure, one end of the mother substrate MS is inserted into the fixing unit GP before the salt treatment process. The size of a portion of the mother substrate MS inserted into the fixing unit GP is considerably less than the size of the entire mother substrate MS. Therefore, the portion of the mother substrate MS inserted into the fixing unit GP does not substantially affect the salt treatment process of the mother substrate MS.

According to an exemplary embodiment of the present disclosure, the portion of the mother substrate MS inserted into the fixing unit GP may be contaminated by residue remaining in the fixing unit GP. This contamination can degrade the strength or transmittance of the mother substrate MS and a display window made from the mother substrate MS. However, according to an embodiment of the present disclosure, even if a portion of the mother substrate MS is contaminated by residue remaining in the fixing unit GP, the contaminated portion of the mother substrate MS is removed in a subsequent removal process. Therefore, according to an embodiment of the present disclosure, contamination of the mother substrate MS by the fixing unit GP and defects caused thereby can be prevented.

Referring to FIG. 10, according to an exemplary embodiment of the present disclosure, the batch reactor BTH has an opening at one end through which the cassette CS together with the mother substrates MS fixed to the fixing unit GP is dipped into the batch reactor BTH. The planar size of the cassette CS and the size of the opening of the batch reactor BTH are shown to be substantially the same in FIG. 10, but this is for convenience of description. The planar size of the cassette CS may be less than the planar size of the opening of the batch reactor BTH.

According to an exemplary embodiment of the present disclosure, a molten salt is provided inside the batch reactor BTH. Since a salt treatment process is performed using a neutral salt, the cassette CS is not corroded by the molten salt. Therefore, a lifetime of a cassette CS can be increased.

According to embodiments, the batch reactor BTH can further include an injection hole IH for injecting salt, a heater HTR that controls a temperature inside the batch reactor BTH, etc.

While embodiments of the present disclosure have been shown and described with reference to certain exemplary embodiments thereof, it will be understood by those skilled in the art that various changes in forms and details may be made therein without departing from the spirit and scope of embodiments of the present disclosure as defined by the appended claims and their equivalents.

Accordingly, the technical scope of embodiments of the present disclosure may be determined by the technical scope of the accompanying claims.

What is claimed is:

1. A method of manufacturing a display window, comprising the steps of:
preparing a mother substrate;
performing a salt treatment on the mother substrate to form a silicon-rich layer in a surface of the mother substrate to a first depth from the surface of the mother substrate, wherein all elements of group 1 and 2 are removed from the mother substrate during the salt treatment, wherein elements of group 1 include alkali metals, and elements of group 2 include alkali earth metals; and
removing the silicon-rich layer,
wherein the first depth is greater than a depth of any cracks in the surface of the mother substrate,
and a ratio of a silicon content in the silicon-rich layer to a silicon content in the mother substrate is about 1.2 to about 1.4.

2. The manufacturing method of claim 1, wherein the salt treatment is performed on the mother substrate with a neutral salt that comprises potassium nitrate.

3. The manufacturing method of claim 2, wherein the neutral salt comprises potassium nitrate and sodium nitrate.

4. The manufacturing method of claim 3, wherein the neutral salt comprises about 70 wt % or more of potassium nitrate with respect to 100 wt % of the neutral salt.

5. The manufacturing method of claim 3, wherein an acidity of the neutral salt is from about pH 6 to about pH 8.

6. The manufacturing method of claim 1, wherein the salt treatment comprises dipping the mother substrate in a molten salt.

7. The manufacturing method of claim 1, wherein the salt treatment is performed on the mother substrate at a temperature of from about 400° C. to about 600° C.

8. The manufacturing method of claim 1, wherein performing a salt treatment on the mother substrate comprises performing a first salt treatment on the mother substrate at a first temperature and performing a second salt treatment on the mother substrate at a second temperature different from the first temperature.

9. The manufacturing method of claim 8, wherein the salt treatment further comprises
performing a heat treatment between the first salt treatment and the second salt treatment.

10. The manufacturing method of claim 1, wherein the first depth is from about 100 nm to about 500 μm.

11. The manufacturing method of claim 1, wherein the silicon-rich layer includes about 72 wt % or more of silicon (Si).

12. The manufacturing method of claim 1, wherein removing the silicon-rich layer includes cleansing; the silicon-rich layer using a basic solution.

13. The manufacturing method of claim 12, wherein removing the silicon-rich layer further includes cleansing the silicon-rich layer using an acidic solution.

14. The manufacturing method of claim 1, wherein after removing the silicon-rich layer, a residual silicon-rich layer having a second depth remains on a surface of the window, and
wherein the second depth is equal to a difference between the first depth and the depth of the crack.

* * * * *